US011327924B2

(12) United States Patent
Wilcock (10) Patent No.: US 11,327,924 B2
(45) Date of Patent: May 10, 2022

(54) ARCHIVING DATA SETS IN A VOLUME IN A PRIMARY STORAGE IN A VOLUME IMAGE COPY OF THE VOLUME IN A SECONDARY STORAGE

(71) Applicant: INTERNATIONAL BUSINESS MACHINES CORPORATION, Armonk, NY (US)

(72) Inventor: Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/734,258

(22) Filed: Jan. 3, 2020

(65) Prior Publication Data

US 2020/0142858 A1    May 7, 2020

Related U.S. Application Data (63) Continuation of application No. 14/458,208, filed on Aug. 12, 2014, now Pat. No. 10,565,159.

(51) Int. Cl.
*G06F 16/11* (2019.01)

(52) U.S. Cl.
CPC .................. *G06F 16/113* (2019.01)

(58) Field of Classification Search
CPC .................................................. G06F 16/113
See application file for complete search history.

(56) References Cited

U.S. PATENT DOCUMENTS

| 7,590,664 B2 | 9/2009 | Kamohara et al. |
| 7,921,267 B1 * | 4/2011 | Yadav .................. G06F 11/2082 |
| | | 711/162 |
| 8,060,714 B1 * | 11/2011 | Natanzon ................ G06F 13/00 |
| | | 711/162 |
| 8,135,748 B2 | 3/2012 | Rosikiewicz et al. |
| 8,286,030 B1 | 10/2012 | Chatterjee et al. |
| 8,621,165 B1 | 12/2013 | Sridharan et al. |
| 2005/0149683 A1 | 7/2005 | Chong, Jr. et al. |

(Continued)

OTHER PUBLICATIONS

Lovelace, M., et al., "IBM z/OS DFSMShsm Primer", IBM Corporation, Technical Support Organization, Document No. SG24-5272-02, Dec. 2013, pp. 496.

(Continued)

*Primary Examiner* — William B Partridge
*Assistant Examiner* — Lahcen Ennaji
(74) *Attorney, Agent, or Firm* — Konrad Raynes Davda & Victor LLP; David W. Victor (57) ABSTRACT

Provided are a computer program product, system, and method for archiving data sets in a volume in a primary storage in a volume image copy of the volume in a secondary storage. A volume image in the secondary storage is created comprising a copy of the volume in the primary storage. For each of a plurality of data sets in the volume, data set level archive operations are performed comprising, determining from metadata for the data set whether an archival policy criteria is satisfied, requesting an exclusive lock to the data set, and in response to obtaining the exclusive lock and determining that the archival policy is satisfied, updating a directory for the data set to indicate that the data set is archived in the volume image.

20 Claims, 5 Drawing Sheets

(56) References Cited

U.S. PATENT DOCUMENTS

| | | | |
|---|---|---|---|
| 2006/0013222 A1* | 1/2006 | Rangan | G06F 3/0635 |
| | | | 370/389 |
| 2006/0161746 A1* | 7/2006 | Wong | H04L 67/1097 |
| | | | 711/162 |
| 2009/0037679 A1 | 2/2009 | Kaushik et al. | |
| 2009/0089523 A1 | 4/2009 | Tsaur et al. | |
| 2009/0259817 A1* | 10/2009 | Sharma | G06F 11/2069 |
| | | | 711/162 |
| 2010/0070726 A1 | 3/2010 | Ngo et al. | |
| 2010/0274825 A1 | 10/2010 | Nemoto et al. | |
| 2011/0099345 A1* | 4/2011 | Mitsui | G06F 11/2069 |
| | | | 711/162 |
| 2012/0084524 A1 | 4/2012 | Gokhale et al. | |
| 2013/0054528 A1 | 2/2013 | Saika | |
| 2013/0166511 A1* | 6/2013 | Ghatty | G06F 11/1469 |
| | | | 707/649 |
| 2014/0279846 A1 | 9/2014 | Srinivasan et al. | |
| 2014/0344539 A1 | 11/2014 | Gordon et al. | |
| 2016/0019224 A1 | 1/2016 | Ahn et al. | |
| 2016/0048522 A1 | 2/2016 | Wilcock | |

OTHER PUBLICATIONS

Office Action 1 for U.S. Appl. No. 14/458,208, dated Jun. 6, 2016, 21 pp.
Response to Office Action 1 for U.S. Appl. No. 14/458,208, dated Sep. 6, 2016, 12 pp.
Final Office Action 1 for U.S. Appl. No. 14/458,208, dated Dec. 29, 2016, 22 pp.
Response to Final Office Action 1 for U.S. Appl. No. 14/458,208, dated Feb. 28, 2017, 13 pp.
Office Action 3 for U.S. Appl. No. 14/458,208, dated Oct. 5, 2017, 22 pp.
Response to Office Action 3 for U.S. Appl. No. 14/458,208, dated Jan. 2, 2018, 12 pp.
Final Office Action 2 for U.S. Appl. No. 14/458,208, dated May 3, 2018, 22 pp.
Response to Final Office Action 2 for U.S. Appl. No. 14/458,208, dated Aug. 3, 2018, 13 pp.
Office Action 5 for U.S. Appl. No. 14/458,208, dated Oct. 18, 2018, 21 pp.
Response to Office Action 5 for U.S. Appl. No. 14/458,208, dated Jan. 18, 2019, 11 pp.
Final Office Action 3 for U.S. Appl. No. 14/458,208, dated May 3, 2019, 24 pp.
Response to Final Office Action 3 for U.S. Appl. No. 14/458,208, dated Jul. 3, 2019, 12 pp.
Response to Final Office Action 3 for U.S. Appl. No. 14/458,208, dated Aug. 15, 2019, 13 pp.
Notice of Allowance 1 for U.S. Appl. No. 14/458,208, dated Oct. 3, 2019, 9 pp.
List of IBM Patents or Patent Applications Treated as Related, Jan. 3, 2020, 2 pp.
U.S. Appl. No. 14/458,208, filed Aug. 20, 2014, pp. 26.

* cited by examiner

ARCHIVING DATA SETS IN A VOLUME IN A PRIMARY STORAGE IN A VOLUME IMAGE COPY OF THE VOLUME IN A SECONDARY STORAGE

BACKGROUND OF THE INVENTION

1. Field of the Invention

The present invention relates to a computer program product, system, and method for archiving data sets in a volume in a primary storage in a volume image copy of the volume in a secondary storage.

2. Description of the Related Art

An information life management (ILM) system manages a data set life cycle through creation until deletion. An ILM system may determine certain data sets or files to migrate to archival storage based on an archive policy, such as the data set not being accessed for a predetermined period of time. If the data set later needs to be accessed, then it may be retrieved from archival storage to the primary storage from where it can be accessed again.

Automated, policy-based data ILM operations are performed at the file level. Storage software performs this function by applying policy criteria to each file based on the file's various metadata stored in catalogs, file structures, etc. The ILM operations including the archiving of the file utilizes host system processor resources to apply the policy criteria, compress files to migrate, and perform the migration operation.

In the current art, users of the International Business Machines ("IBM®") DB2® database software have archived database objects when copying the objects to tape. With this technique, after all of the object level copies have been created on disk, the user invokes a hierarchical storage management operation, with the DFSMShsm function to archive all of the object level copies onto tape via a MIGRATE function. This function processes all of the objects at the file level, compresses the data onto tape and then updates the catalog entries for the data object to indicate that the objects have been archived. When the object needs to be retrieved, the file system intercepts any reference to the data and automatically returns the image copy back to disk so that it can be processed. (IBM and DB2 are registered trademarks of IBM in the United States and other countries).

SUMMARY

Provided are a computer program product, system, and method for archiving data sets in a volume in a primary storage in a volume image copy of the volume in a secondary storage. A volume image in the secondary storage is created comprising a copy of the volume in the primary storage. For each of a plurality of data sets in the volume, data set level archive operations are performed comprising, determining from metadata for the data set whether an archival policy criteria is satisfied, requesting an exclusive lock to the data set, and in response to obtaining the exclusive lock and determining that the archival policy is satisfied, updating a directory for the data set to indicate that the data set is archived in the volume image.

DETAILED DESCRIPTION

Described embodiments provide techniques for using an image level copy of a volume to archive data sets for the volume. After the image level copy is made of the volume on a secondary or archival storage, metadata for the data sets in the volume may be captured and then used during data set level archive operations to determine whether the data set satisfies an archival policy criteria. An exclusive lock is then used to lock the data set satisfying the archival policy criteria to allow the data set archive operation to continue by updating a data set directory to indicate that the data set has been archived.

Figure 1:
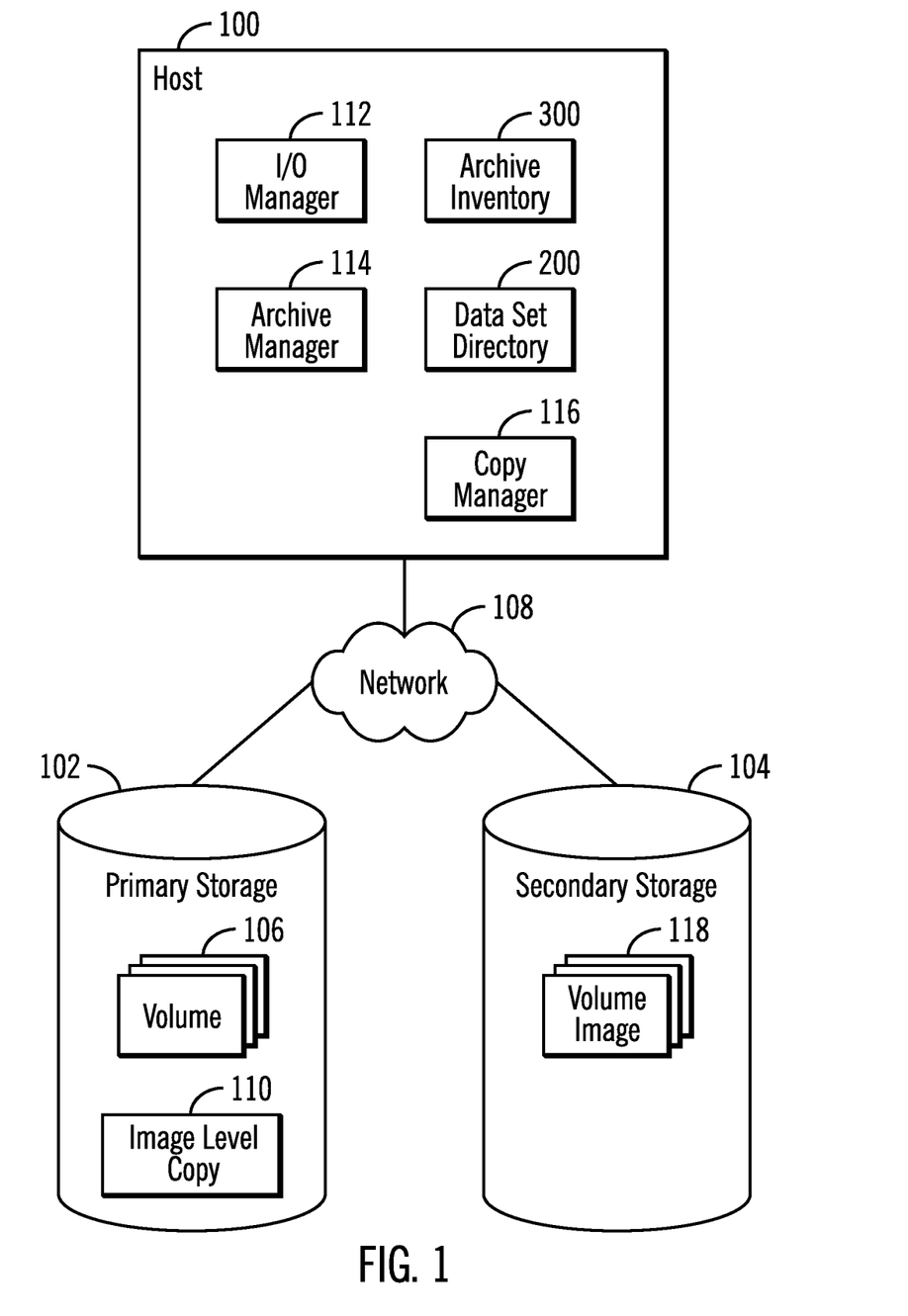
FIG. 1 illustrates an embodiment of a storage environment.

FIG. 1 illustrates an embodiment of a storage environment having a host system 100 that is connected to a primary storage system 102 and a secondary storage system 104, which may be used to archive data sets in volumes 106 in the primary storage 102. In one embodiment, the secondary storage system 104 may comprise a lower cost storage, such as a tape or inexpensive disk storage suitable for archive storage, and the primary storage system 102 may comprise faster access devices, such as a fast access hard disk drives, solid state storage devices, etc., suitable for the production volume. The host system 100 may communicate with the primary 102 and secondary 104 storage systems through a network 108, direct cables, over a storage interface in host 100 hardware, etc.

The host system 100 includes an Input/Output ("I/O") manager 112 to manage read and write requests directed to the primary storage 102; a data set directory 200 having a record for each data set in the volume 106 providing metadata and other information for the data sets, such as a volume table of contents ("VTOC"); an archive inventory 300 having records for data sets archived to the secondary storage 104; an archive manager 114 for managing the archiving of data from the primary storage 102 to the secondary storage 104; and a copy manager 116 to create image level copies 110, such as point-in-time copies, of the volumes 106. The archive manager 114 may create a volume image 118 of the volume 106, which is created by an image level copy operation that copies data at the track or block level.

A data set may comprise any logical representation of data stored in a volume 106, such as a file, object, data set of extents, etc., to which tracks or physical blocks in the storage map.

The host 100 may comprise an enterprise storage controller/server suitable for managing access to attached storage devices. The network 108 may comprise a Storage Area Network (SAN), Local Area Network (LAN), Intranet, the Internet, Wide Area Network (WAN), peer-to-peer network, wireless network, arbitrated loop network, etc. The volumes 106 may be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices used to implement the primary 102 and secondary 104 storages may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. As discussed in certain embodiments, the primary storage 102 may be comprised of a faster access storage device than the secondary storage 104.

Figure 2:
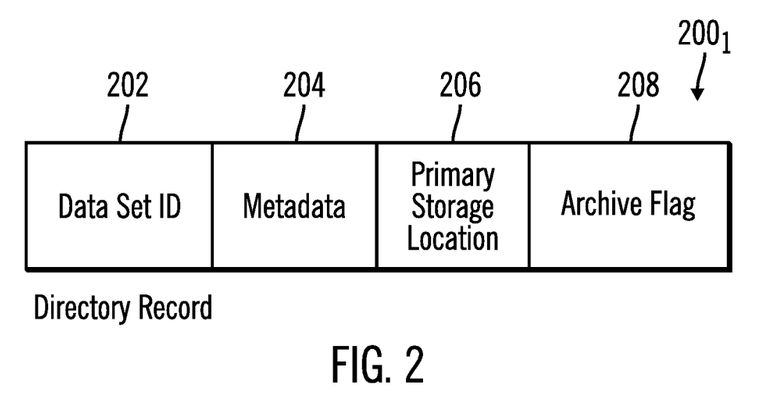
FIG. 2 illustrates an embodiment of a directory record.

FIG. 2 illustrates an embodiment of an instance of a data set directory record $200_i$ in the data set directory 200 for a data set in the volume 106 as including a data set identifier (ID) 202 identifying the data set; metadata 204 for the data set, such as file size, file type, last time referenced, number of references, priority, etc.; a primary storage location 206 indicating a location in the primary storage 104 at which the data set 202 is stored; and an archive flag 208 indicating whether the data set has been archived to the secondary storage 104.

Figure 3:
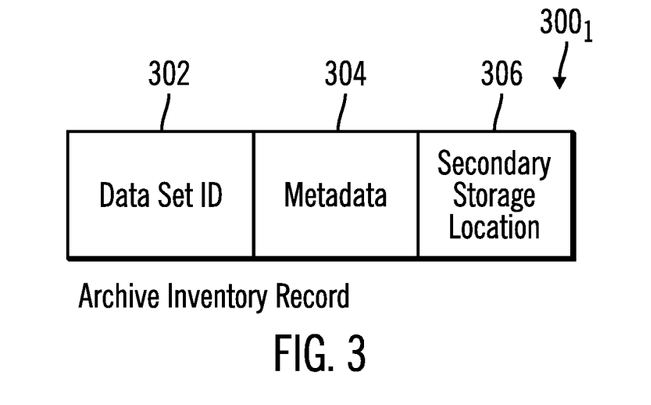
FIG. 3 illustrates an embodiment of an archive inventory record.

FIG. 3 illustrates an embodiment of an instance of an archive inventory record $300_i$ for a data set that is archived to the secondary storage 104, and includes a data set ID 302; metadata 304 for the data set; and a secondary storage location 306 at which the data set 302 is archived in the volume image 118.

Figure 4A:
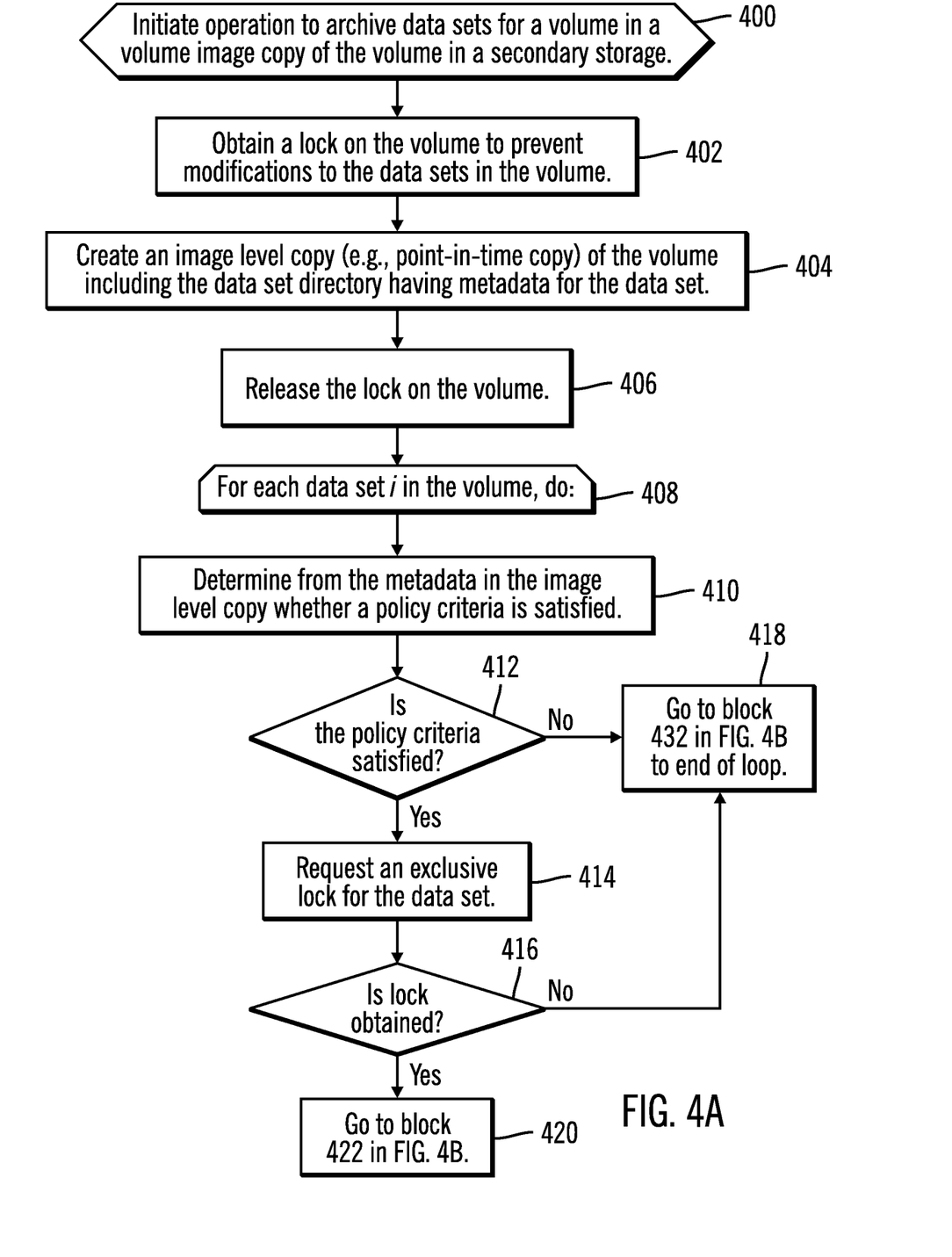
FIGS. 4a and 4b illustrate an embodiment of operations to archive data sets for a volume illustrate an embodiment of operations to establish a failover session.
Figure 4B:
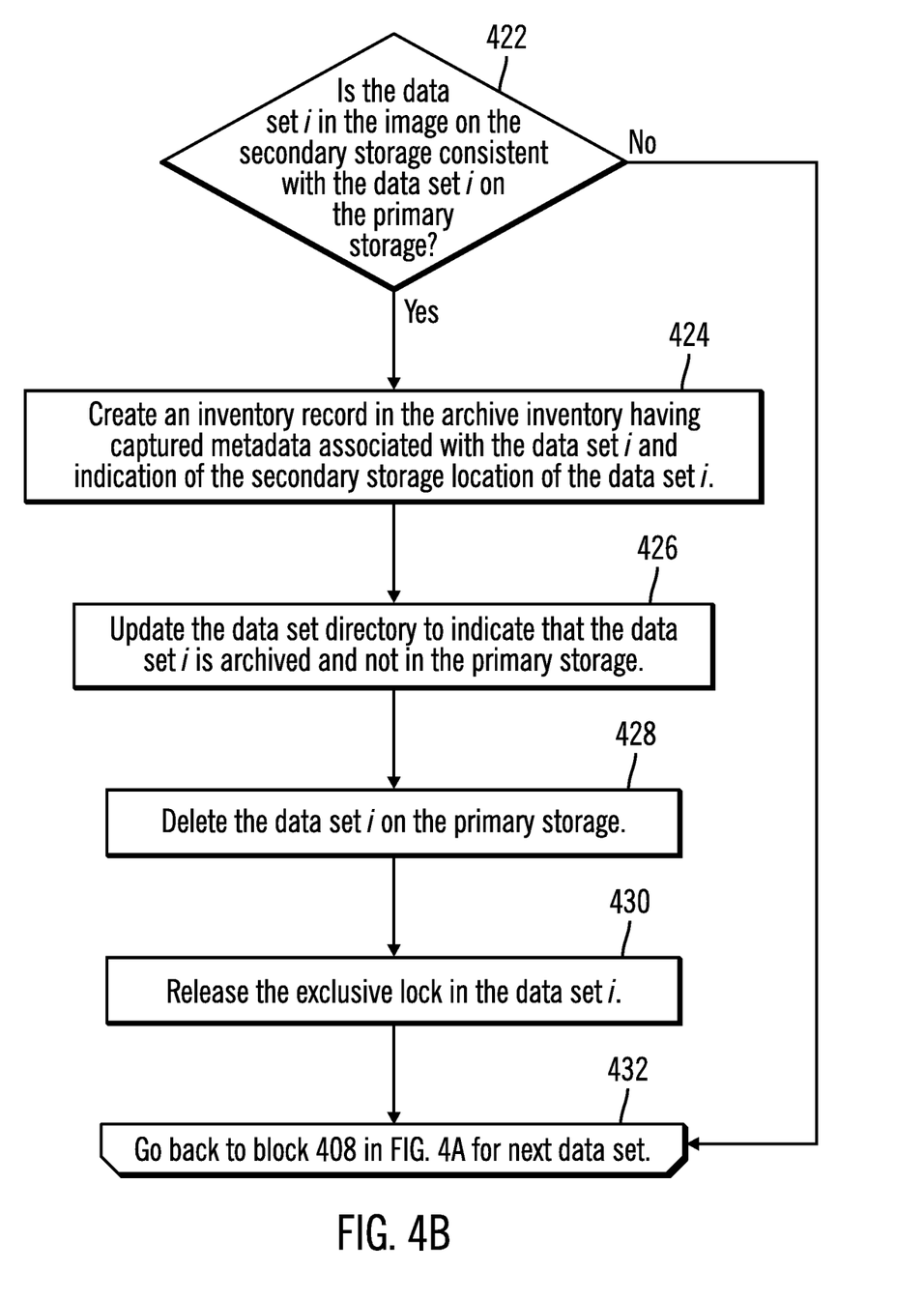

FIGS. 4a and 4b illustrate an embodiment of operations performed by the archive manager 114 to archive data sets in in the volume 106 in the volume image 118 created from the volume 106. Thus, the operations of FIGS. 4a and 4b may be performed after the volume image 118 is created by performing an image level copy of the volume 106 to the volume image 118. Upon initiating (at block 400) the archive operations for a volume 106 in a volume image 118 copy of the volume 106 in the secondary storage 104, the archive manager 114 obtains (at block 402) a lock on the volume 106 to prevent modification of the data sets in the volume 106, such as a VTOC lock or lock on the data set directory 200 to prevent any intervening process from updating the volume. Upon obtaining the volume lock, the archive manager 114 creates (at block 404) an image copy level 110 of the volume 106 including the data set directory 220 having metadata for the data sets in the volume 106 for a point-in-time after the image volume 116 was created. The archive manager 114 may invoke a copy manager 116 to create the image copy level 110. After creating the image copy level 110, the archive manager 114 releases (at block 406) the lock on the volume 106. However, at this point, the data sets in the image copy level 110 may differ from those in the volume image 118 if the data sets were updated while the volume image 118 was being created.

In certain embodiment, the volume lock obtained at block 402 does not prevent file level updates to the volume 106. The lock may only prevent files from being created, extended and deleted on the volume while the image level copy 110 is created. This ensures that the image level copy 110 is structurally sound while still allowing most application access to the volume 106.

The image copy level 110 may be created using a point-in-time copy operation using point-in-time copy software, such as the IBM FlashCopy® (FlashCopy is a registered trademark of IBM), snapshot, etc. An image level copy replicates data in a manner that appears instantaneous and allows a host to continue accessing the source volume while actual data transfers to the copy volume are deferred to a later time. The image level copy appears instantaneous because complete is returned to the copy operation in response to generating the relationship data structures without copying the data from the source to the target volumes. Point-in-time copy techniques typically defer the transfer of the data in the source volume 106 at the time the point-in-time copy relationship was established to the image copy level 110 until a write operation is requested to that data block on the source volume. The point-in-time copy relationships that are immediately established in response to the point-in-time copy command include a bitmap or other data structure indicating the location of blocks in the volume at either the source volume or the copy volume. The image level copy as of the point-in-time of its creation comprises the combination of the data in the source volume 106 and the data to be overwritten by the updates transferred to the image level copy 110.

A loop of data set level archive operations is then performed at blocks 408 through 432 for each data set i in the volume 106 for which the volume image 118 was created. The archive manager 114 determines (at block 410) from the metadata for the data set i in the data set directory captured in the image copy level 110 whether a policy criteria is satisfied. In one embodiment, the policy criteria may archive data sets that have not been referenced within a predetermined number of days, or based on one or more other criteria, such as a file type, priority of the file, etc. If (at block 412) the policy criteria is satisfied, then the archive manager 114 requests (at block 414) an exclusive lock for the data set i, to serialize access to the data set i and prevent other processes from modifying the data set i while the archive data set i is being considered for archival. If (at block 416) the lock is obtained, then control proceeds (at block 420) to block 422 in FIG. 4b. If (at block 416) the data set level lock cannot be obtained to serialize access to the data set, then another process may have write access to the data set that is open and may be changing the data set i so that is no longer consistent with the copy in the volume image 118. In such case, that the lock cannot be obtained, control proceeds to block 418 to skip the data set i.

With respect to block 422 in FIG. 4b, a determination is made whether the data set i in the volume image 118 on the secondary storage 104 is consistent with the data set i on the primary storage 102. This consistency check may be performed by comparing the metadata of the data set i in the volume image 118 with the metadata of the current data set i in the volume 106. A data set in the volume image 118 would be inconsistent if the data was updated while the volume image 118 was being created or while the data set level archive operations are performed at blocks 406-432. Further to perform the consistency check operation at block 422, the archive manager 114 may access the copy of the data set i in the volume image 118 by searching the volume image 118 for the data set by the data set name 202 or identifier. The located data set may then be copied from the volume image 118 to another location from where the metadata for the data set may be rebuilt and then the rebuilt metadata is used to compare with the current metadata 204 for the data set in the directory record $200_i$.

If (at block 422) the data set i in the volume image 118 is consistent, then archiving continues by creating (at block 424) an inventory record $300_i$ in the archive inventory 300 including captured metadata 304 associated with the data set i and indication of the secondary storage location 306 in the volume image 118 of the data set i. The data set directory record $200_i$ for the data set i is updated (at block 426) to indicate that the data set i is archived and not in the primary storage 102, which may be implemented by setting the archive flag 208 to indicate that the data set i is archived and setting the primary storage location 206 field to null. The data set i on the primary storage 102 is deleted (at block 428) and the exclusive lock on the data set i (at block 430) is released.

If (at block 412) the metadata in the image copy level 110 did not satisfy the archive policy criteria or if the data set lock could not be obtained due to another process currently modifying the data set i (at block 416) of if (at block 422) the data set in the volume image 106 is not consistent with the current data set in the primary volume 102 (at block 422), then that data set i is skipped and not archived and control proceeds to block 432 to consider the next data set in the volume 106 until all data sets in the volume 106 have been considered.

After eligible data sets have been archived, the I/O manager 112 upon receiving an I/O request directed toward a data set having an archive flag 208 set indicating the data set has been archived, may then retrieve the data set from the volume image 118 to restore in the primary storage 102 from where I/O access may be provided to the data set. After migrating a data set back from the volume image 118, the primary storage location 206 may be updated to indicate the location at which the data set was rebuilt and the archive flag 208 may be set to indicate that the data set is not archived. Further, the inventory record $300_i$ for that data set may be invalidated.

With described embodiments, a data set may be archived by using the copy of the data set in a volume image 118 created using an image level copy 110 of the volume 106, e.g., track or block level backup, and then confirmation steps are performed to use the copy of the data set in the volume image 118 as an archive if the copy in the volume image 118 is consistent with the data set in the primary storage 102. Further, with described embodiments, an image level copy 110 of the metadata for the data set, created after the volume image 118 is created, is used to determine whether the data set metadata satisfies an archive policy criteria. This allows the policy criteria determination for the data set to be performed without obtaining a lock on the data set.

Although the lock on the data set for the data set level archive operations is obtained after confirming the data set at the time the image level copy was created satisfies the policy criteria, a further consistency check comparing the metadata for the actual data set copy in the volume image 118 is performed during the data set archive level operations because the data set may have changed after creating the image level copy 110 (e.g., point-in-time copy) because only data set level locks are held during the data set level archive operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
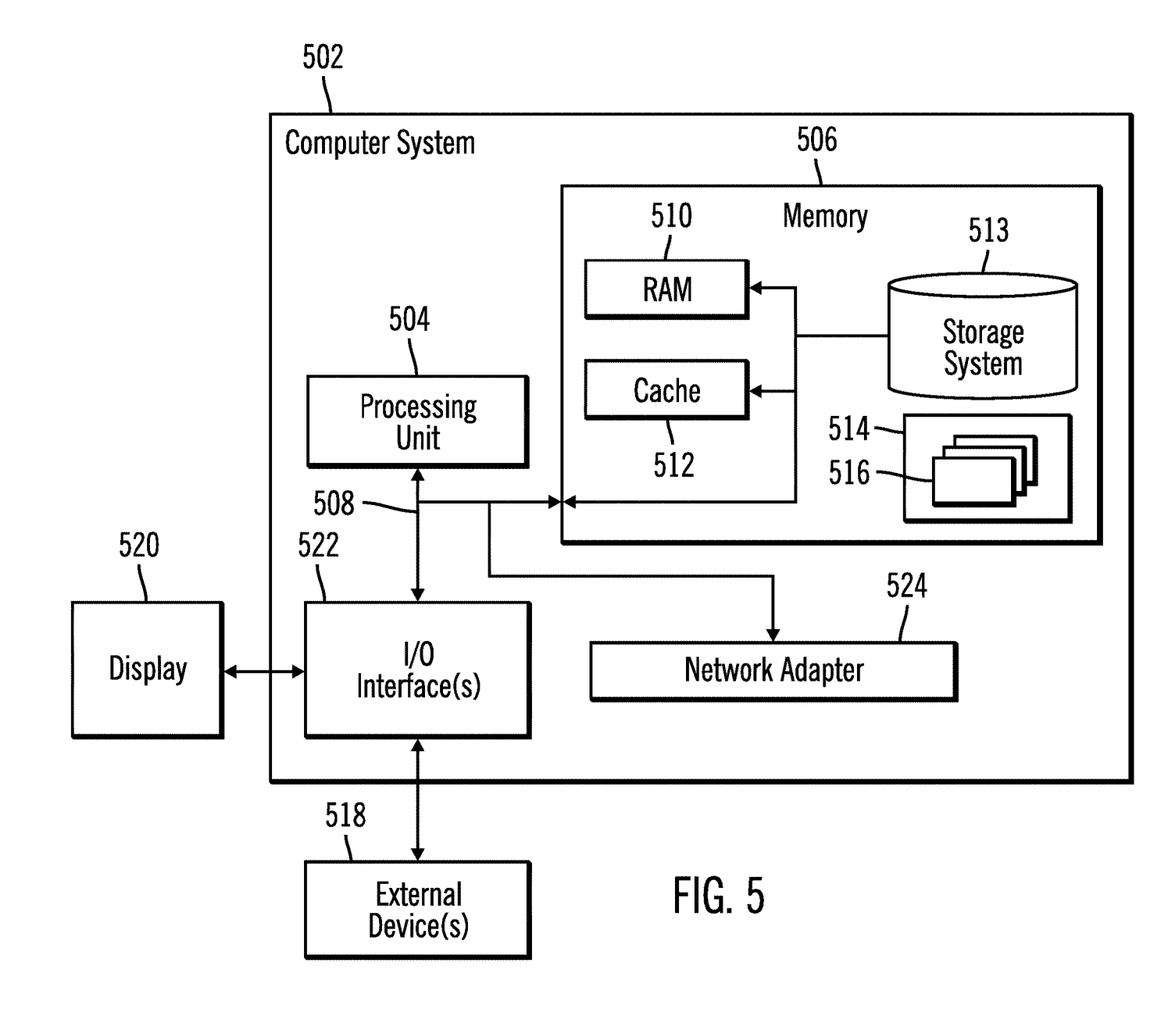
FIG. 5 illustrates a computing environment in which the components of FIG. 1 may be implemented.

The host 100 of FIG. 1 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing units 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for archiving data sets in a volume in a primary storage in a secondary storage, wherein the computer program product comprises a computer readable storage medium having program instructions embodied therewith, the program instructions executable by a processor to cause operations, the operations comprising:

in response to obtaining a lock on a volume, creating a volume image in the secondary storage comprising a copy of the volume in the primary storage including volume metadata for data sets in the volume by performing an image level copy operation that copies data at a track or block level;

in response to releasing the lock on the volume after creating the volume image in the secondary storage, for data sets in the volume, comparing volume image metadata for the data sets in the volume image with the volume metadata for the data sets in the volume in the primary storage to determine whether the data sets in the volume image are consistent with the data sets in the primary storage, wherein the volume image metadata comprises one of a copy of the volume metadata when creating the volume image and metadata rebuilt from the data sets in the volume image; and for consistent data sets in the volume image that are consistent with the data sets in the primary storage, creating inventory records indicating that the consistent data sets are archived in the secondary storage, wherein an inconsistent data set in the volume image results from a file level update to the data set in the volume while the lock is held.

2. The computer program product of claim 1, wherein the inventory records for the consistent data sets include at least one of captured metadata for the consistent data sets and indication of a secondary storage location in the secondary storage of the consistent data sets in the volume image.

3. The computer program product of claim 1, wherein the operations further comprise:

updating a data set directory for the volume in the primary storage to indicate that the consistent data sets are archived and not in the primary storage.

4. The computer program product of claim 1, wherein a data set in the volume image is inconsistent if the data set was updated while the volume image including the data set was being created or while an inventory record was being created for the data set.

5. The computer program product of claim 1, wherein the lock on the volume does not prevent a file level update to a data set in the volume that would result in the data set having the file level update being inconsistent with the data set in the primary storage.

6. The computer program product of claim 1, wherein the operations further comprise:

after creating the volume image in the secondary storage, for data sets in the volume, determining from the metadata for the data sets in the volume image whether the data sets satisfy a policy criteria, wherein the determining whether the data sets in the volume image are consistent is performed for the data sets having metadata indicating that the policy criteria is satisfied.

7. A system for archiving data sets in a volume in a primary storage in a secondary storage, comprising:

a processor; and a computer readable storage medium having program instructions embodied therewith that when executed by the processor causes operations, the operations comprising:

in response to obtaining a lock on a volume, creating a volume image in the secondary storage comprising a copy of the volume in the primary storage including volume metadata for data sets in the volume by performing an image level copy operation that copies data at a track or block level to the volume image and copies volume metadata to volume image metadata;

in response to releasing the lock on the volume after creating the volume image in the secondary storage, for data sets in the volume, comparing the volume image metadata for the data sets in the volume image with the volume metadata for the data sets in the volume in the primary storage to determine whether the data sets in the volume image are consistent with the data sets in the primary storage, wherein the volume image metadata comprises one of a copy of the volume metadata when creating the volume image and metadata rebuilt from the data sets in the volume image; and for consistent data sets in the volume image that are consistent with the data sets in the primary storage, creating inventory records indicating that the consistent data sets are archived in the secondary storage, wherein an inconsistent data set in the volume image results from a file level update to the data set in the volume while the lock is held.

8. The system of claim 7, wherein the inventory records for the consistent data sets include at least one of captured metadata for the consistent data sets and indication of a secondary storage location in the secondary storage of the consistent data sets in the volume image.

9. The system of claim 7, wherein the operations further comprise:
updating a data set directory for the volume in the primary storage to indicate that the consistent data sets are archived and not in the primary storage.

10. The system of claim 7, wherein a data set in the volume image is inconsistent if the data set was updated while the volume image including the data set was being created or while an inventory record was being created for the data set.

11. The system of claim 7, wherein the lock on the volume does not prevent a file level update to a data set in the volume that would result in the data set having the file level update being inconsistent with the data set in the primary storage.

12. The system of claim 7, wherein the operations further comprise:
after creating the volume image in the secondary storage, for data sets in the volume, determining from the metadata for the data sets in the volume image whether the data sets satisfy a policy criteria, wherein the determining whether the data sets in the volume image are consistent is performed for the data sets having metadata indicating that the policy criteria is satisfied.

13. A method for archiving data sets in a volume in a primary storage in a secondary storage, comprising:
in response to obtaining a lock on a volume, creating a volume image in the secondary storage comprising a copy of the volume in the primary storage including volume metadata for data sets in the volume by performing an image level copy operation that copies data at a track or block level to the volume image and copies volume metadata to volume image metadata;
in response to releasing the lock on the volume after creating the volume image in the secondary storage, for data sets in the volume, comparing the volume image metadata for the data sets in the volume image with the volume metadata for the data sets in the volume in the primary storage to determine whether the data sets in the volume image are consistent with the data sets in the primary storage, wherein the volume image metadata comprises one of a copy of the volume metadata when creating the volume image and metadata rebuilt from the data sets in the volume image; and
for consistent data sets in the volume image that are consistent with the data sets in the primary storage, creating inventory records indicating that the consistent data sets are archived in the secondary storage, wherein an inconsistent data set in the volume image results from a file level update to the data set in the volume while the lock is held.

14. The method of claim 13, wherein the inventory records for the consistent data sets include at least one of captured metadata for the consistent data sets and indication of a secondary storage location in the secondary storage of the consistent data sets in the volume image.

15. The method of claim 13, wherein a data set in the volume image is inconsistent if the data set was updated while the volume image including the data set was being created or while an inventory record was being created for the data set.

16. The method of claim 13, wherein the lock on the volume does not prevent a file level update to a data set in the volume that would result in the data set having the file level update being inconsistent with the data set in the primary storage.

17. The method of claim 13, further comprising:
after creating the volume image in the secondary storage, for data sets in the volume, determining from the metadata for the data sets in the volume image whether the data sets satisfy a policy criteria, wherein the determining whether the data sets in the volume image are consistent is performed for the data sets having metadata indicating that the policy criteria is satisfied.

18. The computer program product of claim 1, wherein an inventory record indicating a data set is archived in the secondary storage is not created in response to determining that the data set in the volume is not consistent with the data set in volume image.

19. The system of claim 7, wherein an inventory record indicating a data set is archived in the secondary storage is not created in response to determining that the data set in the volume is not consistent with the data set in volume image.

20. The method of claim 13, wherein an inventory record indicating a data set is archived in the secondary storage is not created in response to determining that the data set in the volume is not consistent with the data set in volume image.

* * * * *